United States Patent
Govoni (10) Patent No.: US 7,486,229 B1
(45) Date of Patent: Feb. 3, 2009

(54) TEST METHOD USED FOR ASSESSING TARGET DETECTION ACCURACY OF GROUND MOVING TARGET INDICATOR DATA

(75) Inventor: Mark A. Govoni, Long Branch, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 28 days.

(21) Appl. No.: 11/713,836

(22) Filed: Feb. 15, 2007

(51) Int. Cl.
G01S 7/40 (2006.01)
G01S 13/52 (2006.01)
H04B 7/185 (2006.01)

(52) U.S. Cl. .......... 342/165; 342/52; 342/160; 342/357.06; 342/357.14

(58) Field of Classification Search .......... 342/165, 342/357.02, 357.06, 357.14, 52–58, 173–174, 342/119, 159, 160
See application file for complete search history.

(56) References Cited

U.S. PATENT DOCUMENTS 6,507,312 B1 * 1/2003 Fredericks et al. .......... 342/173

2008/0034871 A1 * 2/2008 Steimel ............. 73/584

* cited by examiner

Primary Examiner—Thomas H Tarcza
Assistant Examiner—Cassi Galt
(74) Attorney, Agent, or Firm—Michael Zelenka; George B. Tereschuk (57) ABSTRACT

The Ground Moving Target Indicator (GMTI) target detection accuracy test system receives, compares and analyzes GMTI test data that is formatted according to the NATO-EX (v.2.01) Standard. The GMTI target detection accuracy test system also uses Global Positioning System (GPS) data from the objective target and target reports generated by the GMTI sensor to display the simulation test results. At the conclusion of the GMTI sensor test, both the GPS and GMTI data are collected and compared using a computer processor and the results are displayed using the MATLAB® program to better indicate detection accuracy and provide a higher level of target detection accuracy. A method for testing artillery target detection accuracy method is also provided for characterizing the performance of any GMTI adhering to the NATO-EX Standard and testing against an objective target outfitted with GPS instrumentation.

15 Claims, 5 Drawing Sheets

FIG. 5A
SLANT RANGE --- SQUARE LINE = TRUTH; CIRCLE LINE = DETECTION

FIG. 5B
SLANT RANGE --- SQUARE LINE = TRUTH; CIRCLE LINE = DETECTION

FIG. 5C
SLANT RANGE --- SQUARE LINE = TRUTH; CIRCLE LINE = DETECTION

INDEX OF ACCEPTABLE SAMPLE

TEST METHOD USED FOR ASSESSING TARGET DETECTION ACCURACY OF GROUND MOVING TARGET INDICATOR DATA

GOVERNMENT INTEREST

The invention described herein may be manufactured, used and licensed by or for the Government of the United States of America without the payment by the Government of any royalties thereon.

FIELD OF THE INVENTION

The present invention pertains generally to radar systems and methods. More particularly, the present invention pertains to testing Ground Moving Target Indicator sensors and wide area surveillance of moving targets.

BACKGROUND OF THE INVENTION

The Ground Moving Target Indicator is a specific type of radar typically employed as a tactical sensor and used by our armed forces to detect movement generated by discrete, non-stationary, ground-based targets at given locations and instances in time. These movements are detected by the well-known Doppler Effect where radar echoes are exploited in a manner that allows the Ground Moving Target Indicator ("GMTI") to distinguish frequency shift(s) relative to its own carrier frequency. Because this shift is proportional to the target's range rate, the GMTI can accurately locate where the target is with respect to its own location.

GMTI sensors operate in the Radio Frequency (RF) spectrum where human visual perception is limited and therefore, RF electronics are required to interpret the target information. With the advent of more reliable RF electronic devices for transceiving these transient signals, it is now possible to convert the transient signals into digitized data. This is extremely useful for testing since the user is able to validate the effectiveness and accuracy of the GMTI sensor.

Figure 1:
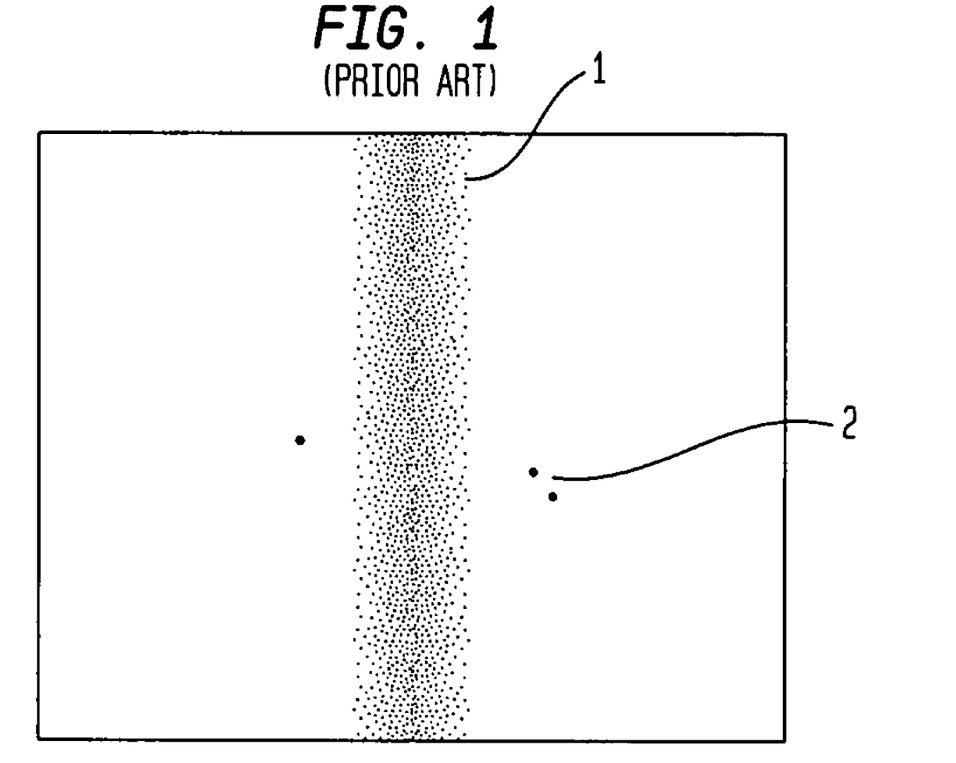
FIG. 1 is a prior art range-Doppler map of raw radar returns.

Despite digitizing the test data, current GMTI sensor test techniques still suffer from a number of problems with performance characterization and the inability to adequately preserve the quality of data following distribution. The current test method for assessing GMTI sensor accuracy and performance is to analyze and interpret range-Doppler maps showing raw radar returns on an image. These range-Doppler maps are then progressively stepped in sequence according to time and the movement of the Doppler generators. FIG. 1 is an example of a prior art range-Doppler map of raw radar returns that shows intrinsic endoclutter as a central cluster 1 spread vertically along the range dimension and about the main radar beam with the Doppler generators of interest being indicated by a number of exoclutter points 2. While the Doppler generators of interest have a finite Signal-to-Noise ratio with a defined threshold detector allowing them to be distinguished from the presence of noise, the FIG. 1 prior art range-Doppler map only provides a rather blurred, fuzzy and imprecise characterization of GMTI sensor performance.

In addition to the FIG. 1 prior art Doppler exoclutter points of interest being blurred, fuzzy and imprecise, the procedure for displaying raw radar returns does not provide any statistical information or ground comparisons. Another limitation of the prior art range-Doppler map is that they are often collected in a proprietary format making them inaccessible by other users in the radar community. Thus, there has been a long-felt need for a GMTI test technique that displays radar returns in a less cumbersome and more efficient manner while preserving a standardized format readily accessible by other users.

In order to overcome the prior art's shortcomings and limitations caused by the inability to preserve data quality in the range-Doppler map, there has been a long-felt need to gather test data in a more familiar and standardized format. The standardized information sources used for artillery testing data collection system is the NATO-EX standard, and none of the currently available GMTI testing techniques use the NATO-EX system. Up until now, there is no available GMTI sensor test technique that provides the necessary clear characterization, less cumbersome operation and adequate preservation of test data needed to overcome the long-felt disadvantages, shortcomings and limitations of the prior art GMTI test systems using the range-Doppler map.

SUMMARY OF THE INVENTION

This invention's test systems and methods resolve and overcome the long-standing disadvantages, shortcomings and limitations of the prior art GMTI range-Doppler map arrangements with testing techniques that provide clear test characterization, less cumbersome operation, high preservation of test data and more accurate assessments of target detection accuracy using data formatted in the NATO-EX (v.2.01) Standard and the MATLAB® computer program. The present invention is directed to test systems that assess target detection accuracy of GMTI data formatted in accordance with the NATO-EX Standard that can also be recorded and stored for later access and analysis. At the conclusion of the GMTI sensor test, both the GMTI and GPS data are collected and compared using a computer processor and the results are displayed using the MATLAB® program to indicate detection accuracies within acceptable tolerances. The method described herein is a sound way for characterizing the performance of any GMTI adhering to the NATO-EX Standard and testing against an objective target outfitted with GPS instrumentation.

Thus, it is an object of the present invention to provide a GMTI test system that provides clear characterization of test results, less cumbersome technique and high preservation of test data that more accurately assesses target detection accuracy.

It is still another object of the present invention to provide a GMTI test technique that provides clear characterization of test results, less cumbersome technique and high preservation of test data that more accurately assesses the target detection accuracy using the MATLAB® computer program to analyze GMTI test data that is formatted according to the NATO-EX Standard.

It is still a further object of the present invention to provide GMTI test methods that provide clear characterization of test results, less cumbersome information processing and high test data preservation for more accurate assessment of target detection accuracy.

These and other objects and advantages are provided by this invention's GMTI sensor test technique that uses the MATLAB® computer program to receive, compare, contrast and analyze GMTI test data that is formatted according to the NATO-EX (v.2.01) Standard. In accordance with the present invention, it is now possible to conduct GMTI sensor tests providing much clearer and more accurate GMTI test information in a way that is more efficient and less cumbersome than prior art techniques and also allows better preservation of simulation testing information, without suffering from the long-standing disadvantages, shortcomings and limitations of the prior art range-Doppler map procedure.

The test equipment and methods of the present invention gather test data from the NATO-EX Standard, which is a standardized information source for GMTI sensors, that has been used by the armed forces because it preserves the integrity and simplicity of having a single data format for the user to access and disseminate. The standard reserves several fields in its format structure for sensors to populate with their respective data. By extracting test data from the widely accepted NATO-EX Standard, this invention's test system preserves the integrity of the test data with a simplified single data format for the user to access and disseminate.

This invention's test system also uses Global Positioning System (GPS) data from the objective target and target reports generated by the GMTI sensor to display the simulation test results in a number of different figures and charts containing subplots that depict the range and cross-range error of accurate detections including the Time-on-Target (ToT) metric, an output of accepted samples of data, a histogram of standard deviations and an indication as to the possible location of substantial tracks based on frequency of detections and instance of occurrence. This invention's test systems also permits wide area surveillance including tracking of single or multiple moving targets. The present invention is also particularly useful for testing purposes and potential deployment capability assessment of a given GMTI sensor adhering to military standards. The present invention encompasses both test systems and a method for testing artillery target detection accuracy, without suffering from the disadvantages, shortcomings and limitations of the prior art.

DETAILED DESCRIPTION OF THE DRAWINGS

The test systems of the present invention collect GPS data from an objective target and GMTI NATO-EX (v.2.01) Standard test data, analyze the collected data, and display the test results in charts with subplots that answer the long-felt needs for clearer characterization, more efficient technique, and better data preservation than prior art range-Doppler maps, as well as providing an improved assessment of target detection accuracy using the MATLAB® computer program to analyze the collected test data. The test systems of the present invention create a final assessment product that intuitively identifies the range and azimuth (Doppler) location accuracies generated by the GMTI sensor by extracting the data from a corresponding NATO-EX file. The test system also verifies that that the NATO-EX file has been populated correctly by the user, or else the program will cease operation. Additionally, analysis of the test system's final outputs provides the user with a new tool to identify problems and deficiencies and institute the necessary improvements. For example, if the user defines a location error prior to a test and a given threshold is breached, then the location error may be further analyzed, reviewed, and rectified.

Figure 2:
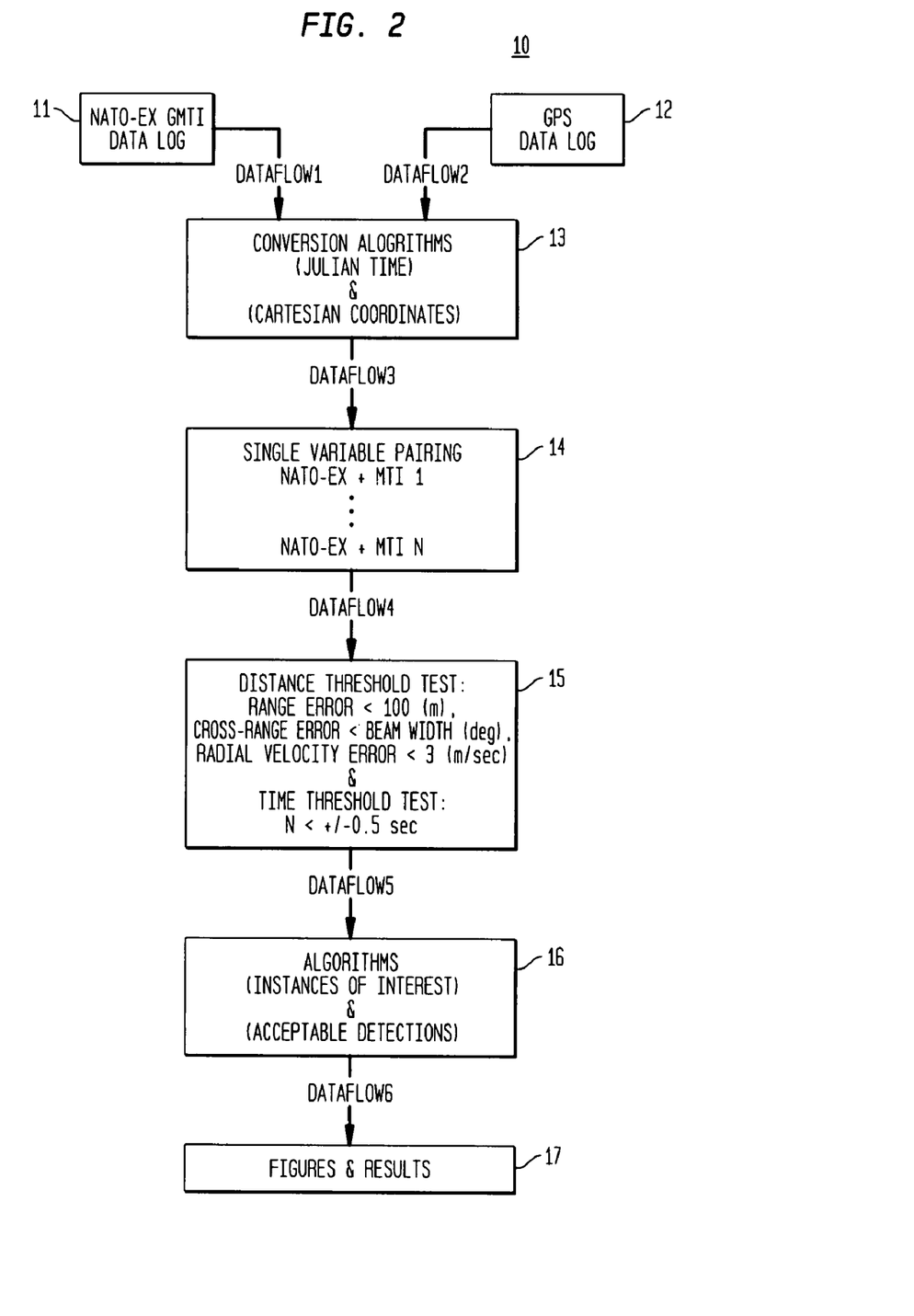
FIG. 2 is a system flow chart illustrating the operation of the present invention.

Referring now to FIG. 2, there is depicted a system flow chart illustrating the operation of this invention's artillery target detection accuracy testing apparatus 10, comprising a means for ground moving target indicator (GMTI) data input 11 and a means for GPS data input 12, a means for data conversion 13, a single pairing matrix assembly module 14, a matrix error correction module 15, a means for calculations 16 and a means for display 17 to display test results. The GMTI data input means 11 collects and stores a GMTI data input from a detector deployed at a test location. The GMTI data input contains ground moving target data that is formatted according to the NATO-EX standard for sensor information. The GMTI data input means 11 also includes a first means for data storage. The GPS data input means 12 collects and stores a GPS data input from a GPS device positioned at an objective target located in proximity to the test location. The GPS data input further comprises a plurality of GPS objective target information, which will serve as a reference point during the comparison and analysis operations of this invention. The GPS data input means 12 also includes a second means for data storage. The GMTI data input means 11 can use Julian time and a Cartesian coordinate system, whereas the GPS data input means 12 can be configured to use C time and a longitude/latitude coordinate system. The data conversion means 13 includes a plurality of conversion algorithms that convert the GMTI data input and the GPS data input into a common machine-readable format where the timestamp is Julian and the coordinate system is Cartesian.

The single pairing matrix assembly module 14 combines the GMTI data input and the GPS data input into a matrix array for easing the process of further sorting, comparing, calculating and processing the two kinds of data. A matrix error correction module 15 compares the ground moving target data from the GMTI data input 11 with the GPS objective target information from the GPS data input 12 and provides a matrix error correction input to the calculations means 16. In operation, the plurality of ground moving target data from the GMTI data input means 11 is compared against the GPS objective target information, which is the actual geographic location of the objective target that serves as a reference point for comparison purposes. The matrix error correction module 15 also performs a number of initial tolerance tests on the matrix to eliminate any unwanted events such as location errors, velocity and time irrelevance. The calculation means 16, using the matrix error correction input, identifies any variances between the ground moving target data and the GPS objective target information in order to determine a target detection level of accuracy for the detector, which is then presented as a graphical display on the display means 17.

Figure 3:
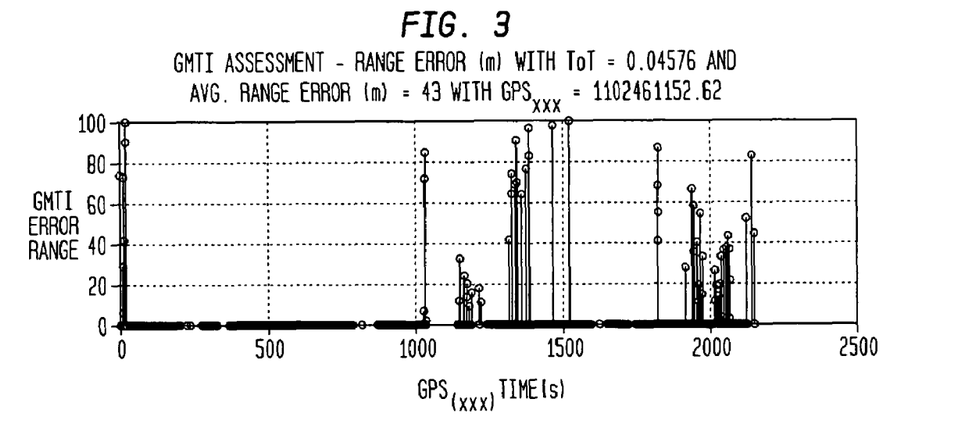
FIG. 3 is a chart plotting one example of range data vs. relative GPS time.
Figure 4:
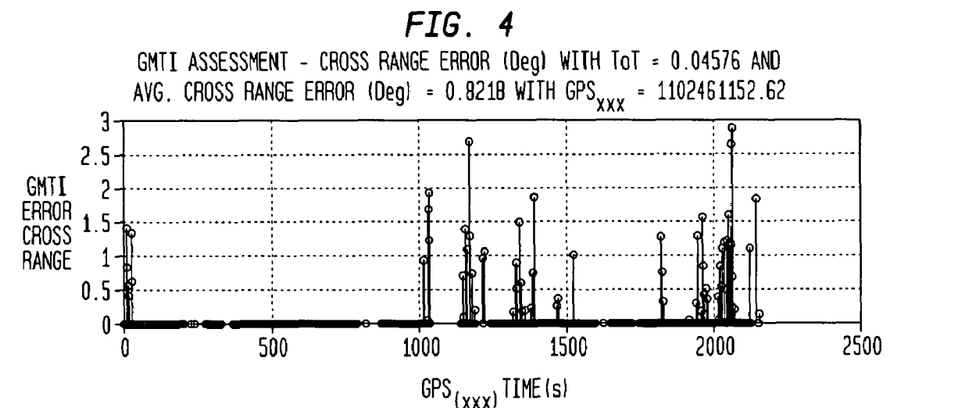
FIG. 4 is a chart plotting an example of cross-range data vs. relative GPS time.

FIG. 3 is a chart showing range error vs. GPS sample, while FIG. 4 is a chart that shows cross-range error vs. GPS sample. It should be noted that $GPS_{rel1}$ refers to the first GPS data point (UNIX time UTC) recorded for the experiment and is used as a global reference point for when the tests were initiated. In order to adequately assess the percentage of time that the sensor is detecting the target within the tolerance levels, the Time-on-Target (ToT) metric is used and is also displayed in the heading of the chart.

Figure 5A:
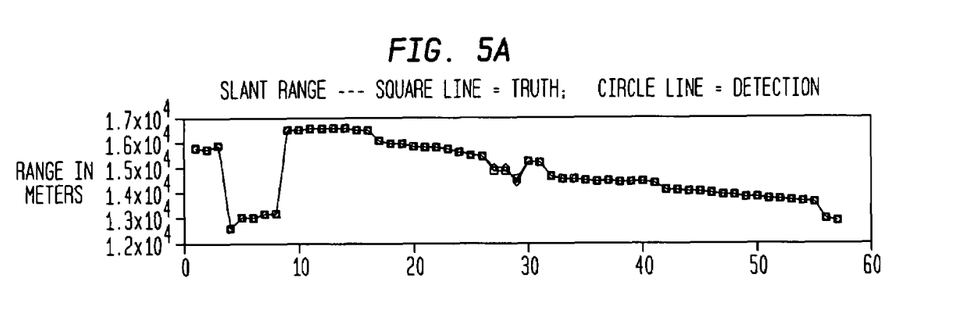
FIGS. 5A-5C are charts illustrating the index of acceptable samples for range, cross-range and radial velocity data.
Figure 5B:
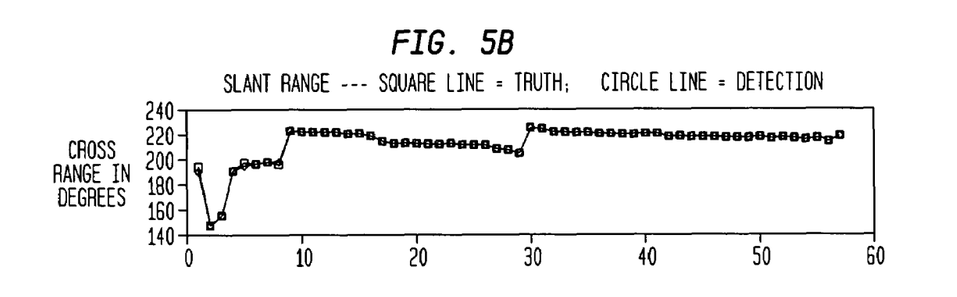
Figure 5C:
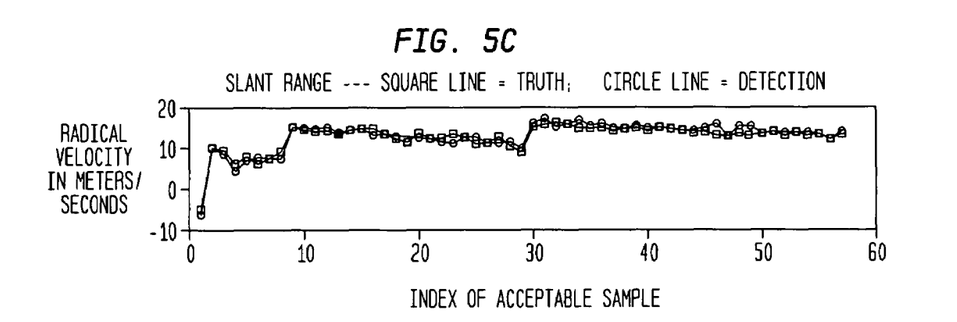

FIGS. 5A-5C are charts plotting the indices of acceptable samples, or those data pairs that passed the tolerance tests, for range, cross-range and radial velocity samples.

Figure 6A:
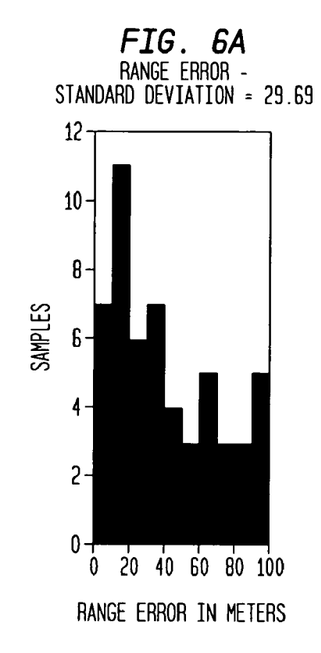
FIGS. 6A-6C are charts illustrating histograms for range error, cross-range error, and radial velocity error.
Figure 6B:
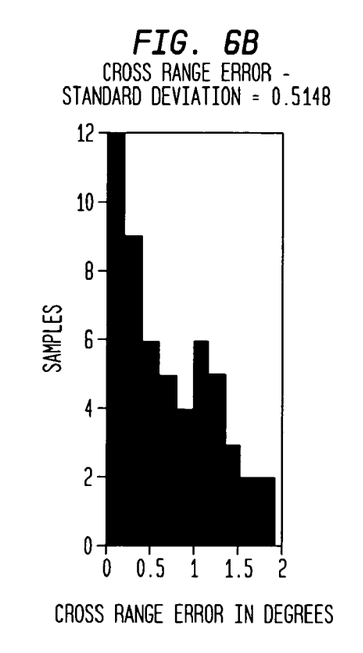
Figure 6C:
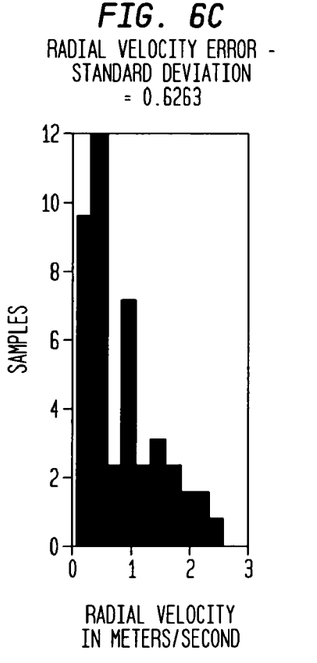

FIGS. 6A-6C are charts showing a histogram containing the range, cross-range, and radial velocity samples. The standard deviation is also displayed in the heading of each subplot within the figure. These charts are examples of the displays using MATLAB where histograms for range error, cross-range error, and radial velocity error are plotted. The standard deviation is also included.

Figure 7:
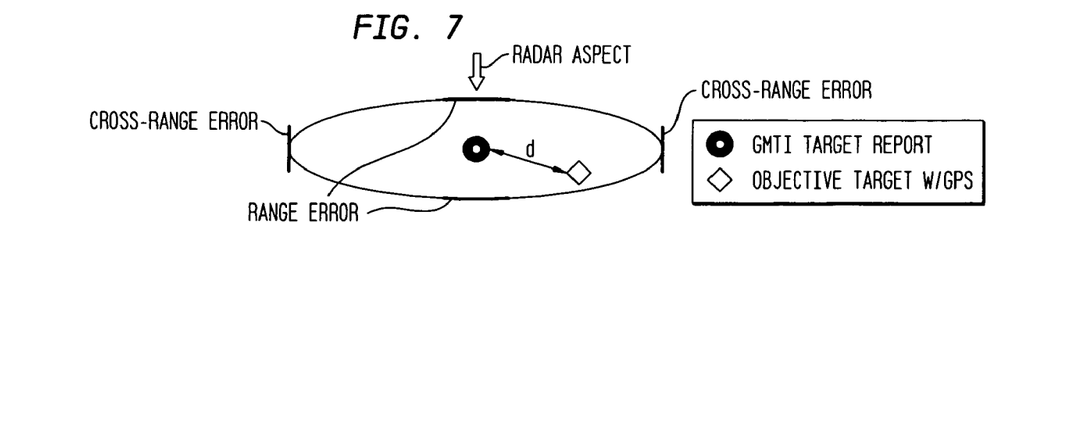
FIG. 7 depicts the Circular Error of Probability (CEP) for the case of an acceptable detection in accordance with the present invention.

In general, a Circular Error of Probability ("CEP") is used to identify the likelihood of detecting a discrete target at a location relevant to the radar at a given instance in time. The assumption here is that the target resides in the radar beam's footprint and is not "out of range." Depending upon the integrity of the radar's receiving process, range accuracy is typically very precise. Conversely, cross-range accuracy is not as precise due to the fact that it is influenced largely by the inherent beam width of the radar. As electromagnetic energy is transmitted, the beam width diverges as slant ranges increase. The natural cross-range accuracy of the radar can be approximated as the product of the slant range and the beam width assuming small angles. The CEP is considered to be a dynamic ellipse about each target report since both radar and target are changing with respect to one another during the test runs.

For each target report generated, the objective vehicle will have a time-dependent, location being recorded by its GPS instrumentation. These times and distances will be compared to each target report on a case-by-case basis. FIG. 7 depicts the CEP for a single case where an acceptable detection would be made, notice the error boundaries.

Referring back to FIG. 2, the user needs to include a number of additional operations for each of the data inputs. For the GPS file, the user should put the data into a "Tab-delimited" text file in the order of the following columns [Time, Latitude, Longitude, and Elevation] where each row in the matrix represents one event, GPS timestamps must be normalized to UNIX time UTC, GPS positions must be normalized to latitude, longitude (decimal degrees), and altitude (WGS1984) and the user must save a text file containing GPS data into the MATLAB working directory. For the NATO-EX file, the user should put the data into a "Tab-delimited" text file where the columns are representative of the "SubField Type" and the numbers are representative of their order so that each row in the matrix represents one detection event, for the "Scan Area Section" (H8), polar format should be used instead of rectangular format, in the case of multiple targets per header, a separate row is given for each target and the header data is repeated in each row and the user must save the text file containing NATO-EX data into the MATLAB working directory. A GMTI target detection accuracy testing system is also within the contemplation of the present invention.

A number of variations of the testing apparatus are within the contemplation of the present invention, such as the graphical display including a number of subplots such as displaying a range and a cross-range error of accurate detections, a Time-on-Target metric, an indication as to where substantial tracks could be created based on frequency of detections and instance of occurrence, the matrix error correction module 15 may modify the GMTI data by adding a Julian timestamp and a Cartesian coordinate system. Other variations include the single pairing matrix assembly module 14 combining data sets to form an array of common instances of occurrence, using the data sets to calculate distance tests and acceptance tests, having a data processing means, the apparatus being operated by a group of software programs and implementing the apparatus in software. Many of these variations also apply to the GMTI target detection accuracy testing system.

The present invention also contemplates a method for testing artillery target detection accuracy. Referring back to FIG. 2, there is depicted a system flow chart illustrating this invention's method, comprising the steps of deploying a detector at a test location to detect movements of moving targets; generating a GMTI data input from the detector, represented by Box 11, the GMTI data input containing ground moving target data and being formatted according to the NATO-EX standard; positioning a GPS device at an objective target in proximity to the test location; generating a GPS data input, represented by Box 12, that includes a plurality of GPS objective target information; receiving and storing the GMTI data input in a means for GMTI input, the GMTI input means having a first means for data storage; receiving and storing the GPS data input in a means for GPS input, which also includes a second means for data storage; converting the GMTI data input and GPS data input into a common machine-readable format in a means for data conversion, represented by Box 13, the data conversion means having a plurality of conversion algorithms; providing the GMTI data input and GPS data input with a Julian timestamp and Cartesian coordinate system; and combining the GMTI data input and GPS data input into a matrix in a single pairing matrix assembly module, represented by Box 14. The method of the present invention continues with the steps of comparing the ground moving target data from the GMTI data input with the GPS objective target information from the GPS data input in a matrix error correction module, represented by Box 15; sending a matrix error correction input from the matrix error correction module 15 to a means for calculations, represented by Box 16; performing a group of calculations in the calculations means to identify variances between the ground moving target data and the GPS objective target information; identifying a plurality of variances between the ground moving target data and the GPS objective target information with the calculations means; determining a level of GMTI target detection accuracy for the detector based upon identifying the plurality of variances; and displaying graphical data identifying the level of GMTI target accuracy on a means for display.

A number of variations of this invention's method for testing artillery target detection accuracy are within the contemplation of the present invention. The data conversion means may include a plurality of conversion algorithms that convert the NATO-EX data input and the GPS data input into a common-machine-readable format. During the combining step 14, the single pairing matrix assembly module may combine the GMTI data input and the GPS data input into a single variable, which could be a matrix array to ease the process of sorting, comparing and calculating the two types of data. The matrix error correction step 15 may include the matrix error correction module performing a group of initial tolerance tests on the matrix to eliminate any unwanted events such as location errors, velocity and time irrelevance. During the calculation step 16, the calculation means 16 may calculate the instances of interest and their associated locations and velocities. The display step 17 may be performed by a display means that plots and displays the results of the simulation test in a number of charts that provide more useful information than the prior art Doppler range maps. A number of the variations of the artillery target detection accuracy testing apparatus and GMTI target detection accuracy testing system embodiments may also apply to this invention's method.

These embodiments of the present invention are intended to be illustrative and not limiting with respect to the variety of possible embodiments. It is to be further understood that other features and modifications to the foregoing detailed description of the target detection apparatus, systems and methods are all considered to be within the contemplation of the present invention, which is not limited by this detailed description. Those skilled in the art will readily appreciate that any number of configurations of the present invention and numerous modifications and combinations of materials, components, geometrical arrangements and dimensions can achieve the results described herein, without departing from the spirit and scope of this invention. Accordingly, the present invention should not be limited by the foregoing description, but only by the appended claims.

What I claim is:

1. A terrestrial moving target accuracy test device, comprising:
    a detector deployed at a test location detects a plurality of terrestrial moving targets and generates a Ground Moving Target Indicator (GMTI) data input containing a plurality of ground moving target information;
    a Global Positioning System (GPS) device positioned at an objective target in proximity to said test location generates a GPS data input, said GPS data input further comprising a plurality of GPS objective target information;
    a means for GMTI data input, having a first means for data storage, receives said GMTI data input and converts said GMTI data input according to a NATO-EX standard;
    a means for confirmation verifies that said GMTI data input is correctly populated according to said NATO-EX standard;
    a means for GPS input, having a second means for data storage, receives and stores said GPS data input;
    a means for data conversion, having a plurality of conversion algorithms, converts said GMTI data input and said GPS data input into a common machine-readable format;
    a single pairing matrix assembly module combines said GMTI data input and said GPS data input into a matrix;
    a matrix error correction module compares said plurality of ground moving target information with said plurality of GPS objective target information that serves as a reference point;
    said matrix error correction module provides a matrix error correction input to a means for calculations;
    said calculations means identifies a group of variances between said plurality of ground moving target information and said plurality of GPS objective target information to determine a level of target detection accuracy;
    said level of target detection accuracy is converted into a graphical display for a user on a means for display;
    said graphical display includes a circular error of probability to identify the likelihood of detecting a discrete target at a location relevant to said test location at a given instance in time; and
    said graphical display indicates a plurality of detection accuracies of said device.

2. The terrestrial moving target accuracy test device, as recited in claim 1, further comprising
    said graphical display includes a group of subplots; and
    said group of subplots include a range and cross-range error of accurate detections, a Time-on-Target (ToT) metric, an output of accepted samples of data, a histogram of standard deviations, and an indication as to where substantial tracks could be created based on frequency of detections and instance of occurrence.

3. The terrestrial moving target accuracy test device, as recited in claim 2, further comprising:
    said matrix error correction module performs a group of initial tolerance tests; and
    said data conversion means modifies said GPS data by adding a C time and a longitude and latitude coordinate system.

4. The terrestrial moving target accuracy test device, as recited in claim 3, further comprising:
    said single pairing matrix assembly module combines a plurality of data sets to form a common instances of occurrence array; and
    said plurality of data sets are used for calculating distance tests and acceptance tests.

5. The terrestrial moving target accuracy test device, as recited in claim 4, further comprising:
    a means for data processing; and
    said device being operated by a group of software programs.

6. A terrestrial moving target accuracy testing system, comprising:
    a detector deployed at a test location detects a plurality of terrestrial moving targets and generates a Ground Moving Target Indicator (GMTI) data input containing a plurality of ground moving target information;
    a Global Positioning System (GPS) device Positioned at an objective target in proximity to said test location generates a GPS data input, said GPS data input further comprising a plurality of GPS objective target information;
    a means for GMTI data input, having a first means for data storage, receives said GMTI data input and converts said GMTI data input according to a NATO-EX standard;
    a means for confirmation verifies that said GMTI data input is correctly populated according to said NATO-EX standard;
    a means for GPS input, having a second means for data storage, receives and stores said GPS data input;
    a means for data conversion, having a plurality of conversion algorithms, converts said GMTI data input and said GPS data input into a common machine-readable format;
    a single pairing matrix assembly module combines said GMTI data input and said GPS data input into a matrix;
    a matrix error correction module compares said plurality of ground moving target information with said plurality of GPS objective target information that serves as a reference point;
    said matrix error correction module provides a matrix error correction input to a means for calculations;
    said calculations means identifies a group of variances between said plurality of ground moving target information and said plurality of GPS objective target information to determine a system level of target detection accuracy;
    said system level of target detection accuracy is converted into a graphical display for a user on a means for display;
    said graphical display includes a circular error of probability to identify the likelihood of detecting a discrete target at a location relevant to said test location at a given instance in time; and
    said graphical display indicates a plurality of detection accuracies of said system.

7. The terrestrial moving target accuracy testing system, as recited in claim 6, further comprising:
    said matrix error correction module performs a group of initial tolerance tests; and
    said data conversion means modifies said GPS data by adding a C time and a longitude and latitude coordinate system.

8. The terrestrial moving target accuracy testing system, as recited in claim 7, further comprising:

said single pairing matrix assembly module combines a plurality of data sets to form a common instances of occurrence array; and said plurality of data sets are used for calculating distance tests and acceptance tests.

9. The terrestrial moving target accuracy testing system, as recited in claim 8, further comprising:

a means for data processing; and said system being operated by a group of software programs.

10. A method for testing terrestrial moving target accuracy, comprising the steps of:

deploying a detector at a test location to detect a plurality of terrestrial moving targets;

generating a ground moving target indicator (GMTI) data input from said detector, said GMTI data input containing a plurality of ground moving target data;

positioning a Global Positioning System (GPS) device at an objective target in proximity to said test location;

generating a GPS data input that includes a plurality of GPS objective target information;

receiving and storing said GMTI data input in a means for GMTI input, said GMTI input means, having a first means for data storage, converts said GMTI data input according to a NATO-EX standard;

verifying that said GMTI data input is correctly populated according to said NATO-EX standard with a means for confirmation;

receiving and storing said GPS data input in a means for GPS input, said GPS input means having a second means for data storage;

converting said GMTI data input and said GPS data input into a common machine-readable format in a means for data conversion said data conversion means having a plurality of conversion algorithms;

combining said GMTI data input and said GPS data input into a matrix with a single pairing matrix assembly module;

comparing said plurality of ground moving target information from the GMTI data input with said plurality of GPS objective target information from the GPS data input in a matrix error correction module;

sending a matrix error correction input from said matrix error correction module to a means for calculations;

identifying a plurality of variances between said plurality of ground moving target information and said plurality of GPS objective target information with said calculations means;

determining a level of target detection accuracy based upon identifying said plurality of variances;

converting said level of target detection accuracy into a graphical display for a user on a means for display;

providing a circular error of probability in said graphical display to identify the likelihood of detecting a discrete target at a location relevant to said test location at a given instance in time; and indicating a plurality of detection accuracies of said method in said graphical display.

11. The method for testing a terrestrial moving target accuracy, as recited in claim 10, further comprising the steps of:

displaying a group of subplots displaying a range and a cross-range error of accurate detections;

displaying a Time-on-Target metric;

displaying an output of accepted samples of data;

displaying a histogram of standard deviations; and displaying an indication as to where substantial tracks could be created based on a frequency of detections and an instance of occurrence.

12. The method for testing terrestrial moving target accuracy, as recited in claim 11, further comprising the steps of:

performing a group of initial tolerance tests by said matrix error correction module; and modifying said GPS data by adding a C time and a longitude and latitude coordinate system.

13. The method for testing terrestrial moving target accuracy, as recited in claim 12, further comprising the steps of:

combining a plurality of data sets in said single pairing matrix assembly module to form a common instances of occurrence array; and using said plurality of data sets for calculating distance tests and acceptance tests.

14. The method for testing terrestrial moving target accuracy, as recited in claim 13, further comprising the step of including a means for data processing.

15. The method for testing terrestrial moving target accuracy, as recited in claim 14, further comprising the step of performing said method with a group of software programs.

* * * * *